May 14, 1940. E. D. PYZEL Re. 21,450
PROCESS FOR THE HYDROGENATION OF OLEFIN POLYMERS
Original Filed March 14, 1936
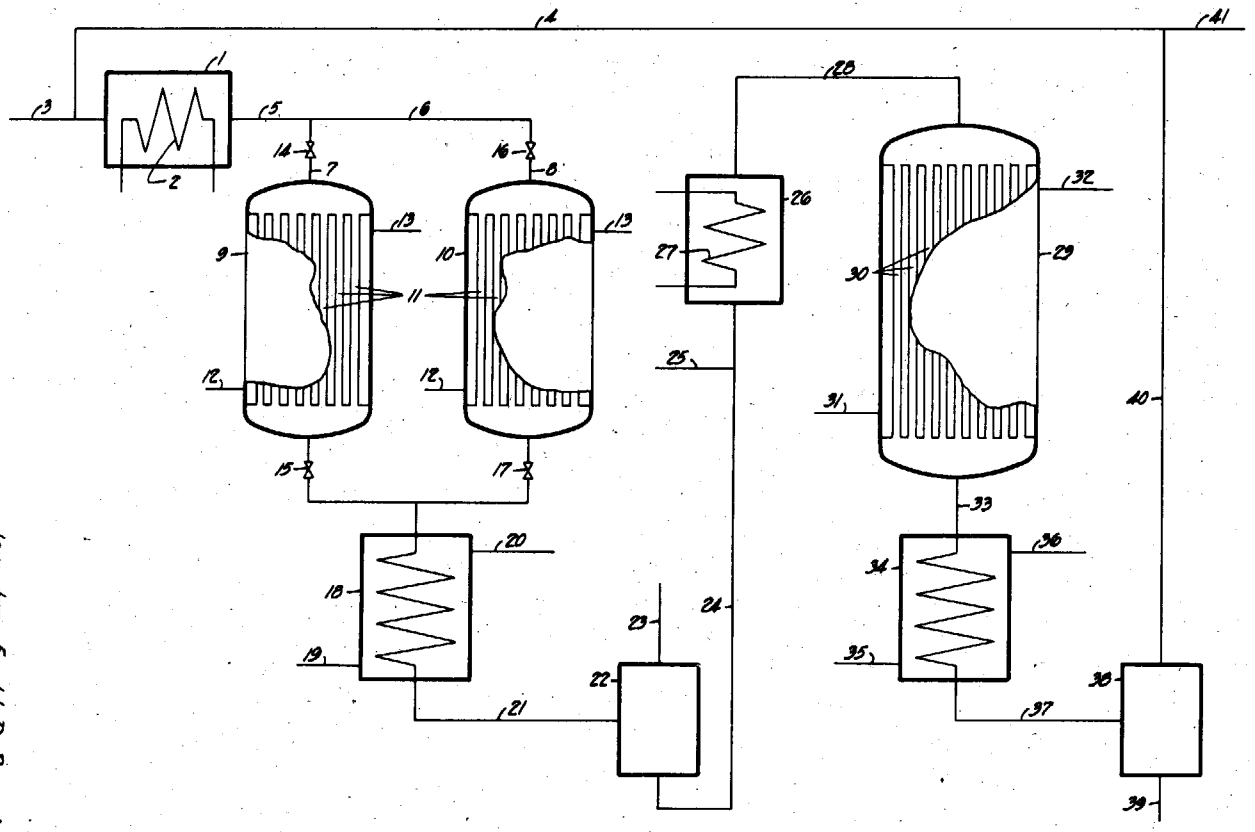
Inventor: Ewald D. Pyzel
By his Attorney: Arthur B. Bakelar Reissued May 14, 1940 Re. 21,450

UNITED STATES PATENT OFFICE 21,450

PROCESS FOR THE HYDROGENATION OF OLEFIN POLYMERS

Ewald D. Pyzel, deceased, late of Pittsburg, Calif., by Shell Development Company, San Francisco, Calif., assignee Original No. 2,147,268, dated February 14, 1939, Serial No. 68,922, March 14, 1936. Application for reissue November 6, 1939, Serial No. 303,039

13 Claims. (Cl. 260—676)

This invention relates to the hydrogenation of polymerization products of olefins and deals with a novel method of carrying out such hydrogenations whereby delays due to poisoning of the hydrogenation catalyst may be avoided and substantially uninterrupted operation economically obtained. It also provides a method of polymer hydrogenation which materially lengthens the life of the catalyst used thereby reducing the cost of operation.

My invention may advantageously be applied to the hydrogenation of either co-polymerization products of olefins, that is polymerization products of one olefin with a similar olefin, or hydrogenation of inter-polymerization products of an olefin with a different unsaturated hydrocarbon, or mixtures of co- and inter-polymerization products may be used. Thus ethylene and/or secondary-base olefins such as propylene, $\alpha$ and $\beta$ butylene, $\alpha$ and $\beta$ amylene, isopropyl ethylene, and the like, and/or tertiary-base olefins including isobutylene, trimethyl ethylene, unsymmetrical methyl ethyl ethylene, and similar hydrocarbons containing a tertiary unsaturated carbon atom, may be used as starting material for the production of the polymers to be hydrogenated. Other more reactive unsaturated hydrocarbons such as diolefins, for example, butadiene, isoprene, and the like, may be present with the olefinic starting material used and may form a part of the polymer or polymer mixture treated.

Any conventional or suitable method of olefin polymerization may be used in preparing the polymerides to be hydrogenated by the method of my invention. The invention is particularly advantageous in its application to the vapor phase hydrogenation of polymers or polymer mixtures boiling in the gasoline range, such, for example, as polymerides of one or more of the butylenes, as an iso-octylene resulting from the co-polymerization of isobutylene or from inter-polymerization of iso-butylene with $\alpha$ and/or $\beta$ butylene or of either or both with butadiene, or of an iso-heptylene such as may be obtained by inter-polymerization of isobutylene with propylene, for example.

As prepared from hydrocarbons derived from petroleum, natural gas, coal tar or other natural sources such polymers are contaminated with varying amounts of impurities, particularly sulfur containing compounds, which are difficult to completely eliminate. Such impurities rapidly poison catalysts of sufficient activity to effect hydrogenation of olefin polymers at practical rates within the limited range of temperatures to which such polymers may be heated without substantial depolymerization or other undesirable decomposition. The interruptions of operation necessary in order to regenerate or replace catalyst so poisoned greatly increase the expense of hydrogenating olefin polymerides.

A theory which completely explains the advantageous results obtained by my novel method of olefin polymer hydrogenation whereby the foregoing difficulties may be substantially avoided has not as yet been evolved as the exact chemical changes which the impurities which cause catalyst poisoning undergo have not been fully determined. Nevertheless, it has been well established that other things being equal, a hydrogenation catalyst has a materially longer life when poison containing polymer material is contacted therewith in the presence of free hydrogen or of compounds capable of yielding free hydrogen under the operating conditions used, than when hydrogen is absent. It has furthermore been found that hydrogenation catalysts which have become so poisoned as to be ineffective in promoting olefin polymer hydrogenation at a practical rate at temperatures below those at which polymer decomposition takes place are nevertheless still capable of rendering at least a substantial part of the catalyst poison content of polymerides innocuous by absorption of further substantial amounts of catalyst poison and/or conversion of the poisonous material into a form which is more easily eliminated before the next hydrogenation step and/or otherwise making the poison less effective or active toward the catalysts in subsequent hydrogenation stages.

Based upon these findings I have developed a commercially applicable process of olefin polymer hydrogenation which not only lengthens the average life of the catalyst used but also eliminates costly interruptions of operation. The process of my invention essentially comprises carrying out the hydrogenation in two stages; first, effecting a partial hydrogenation in preferably a plurality of converters connected in parallel, and second, completing the hydrogenation in another unit in series with the first parallel connected converters. By this method of operation one, or more, of the converters used for the first partial hydrogenation of the olefin polymer may be disconnected from the circuit and the catalyst therein regenerated or replaced without interference with the operation of the remaining preliminary hydrogenation converter or converters. The final polymer hydrogenation may be carried out in a single converter or a plurality of converters in either series, parallel or series-parallel arrangement. This procedure involving a preliminary reaction in the presence of free hydrogen has been found to materially prolong the average effective life of the catalyst used, particularly when, as is preferred, a separation of impurities from the incompletely hydrogenated polymer is carried out between hydrogenation stages. Such a method of operation, in fact, substantially eliminates catalyst poisoning in the final hydrogenation stage and, under properly controlled temperature conditions, the life of the catalyst in the final converters may be almost indefinitely prolonged.

One plausible suggestion which has been advanced to explain the remarkable improvement in results, particularly the unusually long average catalyst life, obtained by my method of operation is that in the preliminary converters, not only is catalyst poison removed by direct absorption and/or reaction with the catalyst but also a part of the poison containing compounds may be decomposed and the poisonous material hydrogenated, for example, sulfur containing impurities may be converted in part to $H_2S$ or some other form which is less reactive and/or more easily eliminated than the sulfur in its original form. Furthermore these changes, whatever their true nature, may not only be effected by active hydrogenation catalysts, but also by catalysts comprising such substantial amounts of poison addition products, for example, nickel sulfide, as to be no longer practically effective in olefin polymer hydrogenation, provided sufficient hydrogen containing gas is present. It will be understood, of course, that the observed facts may be explained equally plausibly in other ways and that no limitation on the scope of my invention is implied in the suggested interpretation of the results obtained thereby.

My process may be carried out with the olefin polymer, or polymer mixture in either the liquid, vapor or mixed liquid-vapor phase. Any effective hydrogenation catalyst may be used, such, for example, as activated nickel, molybdenum, the metals of the platinum group, particularly platinum and palladium, and the like, with or without promoters such as thoria, ceria, etc. The catalyst chosen is preferably used with a support as, adsorbed on pumice, procelain, or the like. Either atmospheric, subatmospheric, or, more preferably, superatmospheric pressures may be used. Elevated pressures tend, in general, to reduce the tendency toward depolymerization but also increase the cost of apparatus so that a moderate pressure of about 25 to 300 pounds is usually most economically advantageous.

The exact conditions of operation in any given case will depend upon the olefin polymer or polymers to be hydrogenated. Lower temperatures and/or higher rates of thruput, that is, shorter times of contact, reduce the danger of polymer decomposition but also tend to decrease the conversion. So in general temperatures of about 170° to about 350° C. are preferred, the higher temperatures being used at the higher pressures, i. e. under liquid phase hydrogenation conditions, while temperatures nearer the lower limit are used in low pressure hydrogenations in the vapor phase.

While the invention is thus susceptible to considerable variation and modification in the manner of its practical application, in order that it may be more clearly understood, it will be described more fully with reference to the accompanying drawing which shows in diagrammatic section one assembly of apparatus particularly adapted to its application to the vapor phase hydrogenation of di-isobutylene.

In the drawing 1 represents a vaporizer containing suitable heating means such as a coil 2 thru which a heating medium is circulated at a temperature and rate sufficient to vaporize the polymer material, in this case di-isobutylene, fed in at 3, and being the mixture of hydrogen containing gas, admitted thru pipe 4 preferably in an amount insufficient for complete reaction with the olefin polymer fed, and di-isobutylene vapors to the desired reaction temperature, preferably about 185° C. when operating under about 30 pounds pressure. It will be obvious that the operations of polymer vaporization and heating to reaction temperature shown for the sake of simplicity as carried out in one operation in the vessel 1 may be effected in suitable separate heaters and advantageously be combined with suitable heat transfer with the intermediate or final reaction products to be described later. The reaction mixture of unhydrogenated di-isobutylene and hydrogen, with or without diluents which may be either gases such as nitrogen or methane or the like or normally liquid compounds, for example, iso-octane, or lower or higher paraffin and/or unsaturated hydrocarbons, is conducted by pipe line 5 to a manifold 6 which provides parallel connection by valve controlled branch lines 7 and 8 to converters 9 and 10. The converters may be of any suitable construction. As shown they each comprise catalyst tubes 11 containing in the present case activated nickel supported on porcelain, and means for controlling the temperature, for example, by circulation of a suitable heating and/or cooling medium thru inlets 12 and outlets 13. By means of valves 14 and 15 converter 9 may be shut off and the catalyst therein reactivated or replaced, by suitable connections not shown, without interruption of the operation of converter 10. Similarly by opening valves 14 and 15 and closing valves 16 and 17 converter 10 may be cut out of the circuit without interference with the operation of converter 9. The partly hydrogenated di-isobutylene from either or both of the converters 9 and 10 is conducted together with the other reaction products through a condenser such as 18 provided with means such as inlet 19 and outlet 20 for circulation of a suitable cooling medium. The condensed mixture of iso-octane and di-isobutylene is transferred via pipe line 21 to a separator 22 where the uncondensed gases are taken off at outlet 23 and the incompletely hydrogenated liquid withdrawn thru pipe 24 and readmixed with hydrogen containing gas at 25. The gases separated at 23 may be vented to the atmosphere, or recirculated thru the system either at 4 or 25. When the hydrogen content of such gases justifies recirculation they are preferably treated for removal of material having a poisonous effect on the catalyst used prior to their return to the system, since these gases may contain part or all of the transformed catalyst poison, for example, hydrogen sulfide resulting from sulfur containing compounds originally present in the olefin polymer. Such treatment for removal of catalyst poison may, for example, comprise water washing and/or alkali scrubbing or other treatment depending upon the nature and amount of impurity or impurities to be removed. In some cases a similar or other suitable purification treatment may be advantageously applied to the incompletely hydrogenated polymer before its admission to the next hydrogenation stage. The gas admitted at 25 preferably contains an excess of free hydrogen above that required for hydrogenation of remaining di-isobutylene to the desired extent. The new reaction mixture is then conducted thru vaporizer and preheater 26 having a heating coil 27 and which may be of the same type as vaporizer 1, and the gaseous mixture passed by pipe line 28 to the final converter 29. This converter may be similar to converters 9 and 10, and have catalyst tubes 30 and inlet 31 and outlet 32 for the circulation of a suitable medium for control of the reaction temperature which is preferably about the same as that used in the primary converters, when the same catalyst is used for both hydrogenation stages. Different catalysts may be used in the different stages, however, and different conditions depending upon the relative activity of the catalysts may be required. It is sometimes advantageous, particularly where the olefin polymers used contain large amounts of catalyst poison, to use a catalyst in the preliminary hydrogenation stage such as cobalt sulfide or molybdenum sulfide, for example, which is a less active hydrogenation catalyst, but which is nevertheless suitable for absorbing and/or transforming catalyst poisoning material in the charging stock and is more resistant to these poisons than the more efficient hydrogenation catalyst used for completion of the hydrogenation, which is preferably a very active catalyst such as activated nickel, or the like. The reacted mixture from converter 29 is withdrawn thru pipe 33 to condenser 34 cooled by circulation of water or other suitable agent thru inlet 35 and outlet 36. The condensed iso-octane is conducted by pipe 37 to separator 38 where the product is withdrawn thru outlet 39 and the remaining hydrogen containing gas taken off thru pipe 40 and conducted to inlet 4 for use in the preliminary hydrogenation, with or without the addition of additional fresh hydrogen containing gas which may be admitted at 41.

By this method of operation not only may truly continuous, uninterrupted operation be readily maintained, but the life of the catalyst in the final converter may be greatly prolonged. In fact, with careful operation to avoid overheating and/or cracking or polymerization which deposits carbon or tar and so covers the active catalyst surface, no substantial diminution has been found in the activity of the catalyst in the final converter after long periods of operation. Furthermore the average life of the catalyst in the system, as measured in gallons of olefin polymer hydrogenated per pound of total catalyst used is very much greater than has been obtainable by previous hydrogenation methods. Operations with di-iso-butylene, for example, have yielded, as an average over months of commercial scale production, over 800 gallons of iso-octane of more than 95% purity per pound of nickel consumed, without catalyst regeneration.

Satisfactory results may also be obtained by many modified procedures embodying the essential feature of the above described illustrative example, and the invention is, therefore, to be regarded as limited only by the terms of the accompanying claims, in which it is my intention to claim all novelty inherent therein as broadly as possible in view of the prior art.

What is claimed as the invention is:

1. In a multi-stage continuous process for effecting the catalytic hydrogenation of an olefin-polymer material to the corresponding saturated material by reaction with free hydrogen in the presence of an active hydrogenation catalyst when the polymer material contains more than a critical concentration of a catalyst poisoning impurity capable of poisoning the hydrogenation catalyst used, the steps which comprise passing the polymer material together with less than a stoichiometrical amount of free hydrogen into contact with the hydrogenation catalyst in the first stage under such conditions that only a part of the polymer material is hydrogenated, separating normally gaseous constituents from the treated material leaving the first hydrogenation stage, and then passing the partially hydrogenated material which has been substantially freed of catalyst poisoning impurities by treatment in the first hydrogenation stage, together with more than a stoichiometrical amount of free hydrogen into contact under hydrogenation conditions with the hydrogenation catalyst in a subsequent hydrogenation stage, whereby substantially complete hydrogenation of the polymer material is effected with substantially no decrease in activity of the catalyst in any hydrogenation stage subsequent to the first.

2. In a multi-stage continuous process for effecting the catalytic hydrogenation of an olefin polymer material to the corresponding saturated material by reaction with free hydrogen in the presence of an active metal-comprising hydrogenation catalyst contained in all hydrogenation stages of the system when the polymer material contains more than a critical concentration of a catalyst poisoning impurity capable of poisoning the hydrogenation catalyst used, the steps which comprise passing the polymer material together with less than a stoichiometrical amount of free hydrogen into contact with the hydrogenation catalyst in the first stage at such a temperature and at such a rate that only a part of the polymer material is hydrogenated, separating normally gaseous constituents from the treated material leaving the first hydrogenation stage, and then passing the partially hydrogenated material, which has been substantially freed of catalyst poisoning impurities by treatment in the first hydrogenation stage, together with more than a stoichiometrical amount of free hydrogen into contact with the hydrogenation catalyst in a subsequent hydrogenation stage under substantially the same conditions existing in the first hydrogenation stage, whereby substantially complete hydrogenation of the polymer material is effected with substantially no decrease in activity of the catalyst in any hydrogenation stage subsequent to the first.

3. The process of claim 2 wherein the first hydrogenation stage comprises a plurality of hydrogenation catalyst-containing converters connected in parallel in such a manner that at least one of them can be readily cut out of the system without interruption of the process.

4. In a multi-stage continuous process for effecting the catalytic hydrogenation of an olefin material to the corresponding saturated material by reaction with free hydrogen in the presence of a hydrogenation catalyst comprising nickel metal and contained in all stages of the system when the polymer material contains more than a critical concentration of a catalyst poisoning impurity, the steps which comprise passing the polymer material together with less than a stoichiometrical amount of free hydrogen into contact with the catalyst in the first hydrogenation stage under such conditions that only a part of the polymer material is hydrogenated, separating normally gaseous constituents from the treated material leaving the first hydrogenation stage, and then passing the partially hydrogenated material, which has been substantially freed of catalyst poisoning impurities by treatment in the first hydrogenation stage, together with more than a stoichiometrical amount of free hydrogen into contact with the hydrogenation catalyst under hydrogenation conditions in a subsequent hydrogenation stage operated under substantially the same conditions as the first stage whereby substantially complete hydrogenation of the polymer material is effected with substantially no decrease in activity of the catalyst in any hydrogenation stage subsequent to the first.

5. In a multi-stage continuous process for effecting the catayltic hydrogenation of a tertiary butylene polymer to the corresponding saturated product by reaction with free hydrogen in the presence of a hydrogenation catalyst essentially comprising nickel metal when the unsaturated polymer material contains more than a critical concentration of a catalyst poisoning impurity, the steps which comprise passing the polymer material together with less than a stoichiometrical amount of free hydrogen into contact with a nickel-containing catalyst maintained at a temperature of from 170° C. to 350° C. in the first hydrogenation stage, and then passing the partially hydrogenated polymer material, which has been substantially freed of catalyst poisoning impurities by treatment in the first hydrogenation stage, together with more than a stoichiometrical excess of free hydrogen into contact with a nickel-containing catalyst at a temperature of 170° C. to 350° C. in a subsequent hydrogenation stage, whereby substantially complete hydrogenation of the polymer material is effected with substantially no decrease in activity of the catalyst in any hydrogenation stage subsequent to the first.

6. The process of claim 5 wherein the excess of hydrogen employed in a hydrogenation stage subsequent to the first stage is separated from the hydrocarbon material leaving said subsequent hydrogenation stage and utilized in the first hydrogenation stage whereby the process is executed with maximum hydrogen utilization efficiency.

7. The process of claim 5 wherein the first hydrogenation stage comprises two nickel catalyst-containing converters connected in parallel in such a manner that one of them can be cut out of the system and the activity of the catalyst therein restored without interruption of the execution of the process.

8. The process of claim 1 wherein the excess of hydrogen employed in a hydrogenation stage subsequent to the first stage is separated from the hydrocarbon material leaving said subsequent hydrogenation stage and utilized in the first hydrogenation stage whereby the process is executed with maximum hydrogen utilization efficiency.

9. The process of claim 1 wherein the first hydrogenation stage comprises a plurality of hydrogenation catalyst-containing converters connected in parallel in such a manner that at least one of them can be readily cut out of the system without interruption of the process.

10. The process of claim 2 wherein the excess of hydrogen employed in a hydrogenation stage subsequent to the first stage is separated from the hydrocarbon material leaving said subsequent hydrogenation stage and utilized in the first hydrogenation stage whereby the process is executed with maximum hydrogen utilization efficiency.

11. The process of claim 4 wherein the excess of hydrogen employed in a hydrogenation stage subsequent to the first stage is separated from the hydrocarbon material leaving said subsequent hydrogenation stage and utilized in the first hydrogenation stage whereby the process is executed with maximum hydrogen utilization efficiency.

12. The process of claim 4 wherein the first hydrogenation stage comprises a plurality of hydrogenation catalyst-containing converters connected in parallel in such a manner that at least one of them can be readily cut out of the system without interruption of the process.

13. The process of claim 4 wherein the first hydrogenation stage comprises a plurality of hydrogenation catalyst-containing converters connected in parallel in such a manner that at least one of them can be readily cut out of the system without interruption of the process, and wherein the excess of hydrogen employed in a hydrogenation stage subsequent to the first stage is separated from the hydrocarbon material leaving said subsequent stage and utilized in the first hydrogenation stage whereby the process is executed with maximum hydrogen utilization efficiency.

SHELL DEVELOPMENT COMPANY,
*Assignee of Ewald D. Pyzel, Deceased,*
By BERNARD J. GRATAMA,
*Assistant Secretary.*